US007014933B2

(12) United States Patent
Collins

(10) Patent No.: US 7,014,933 B2
(45) Date of Patent: Mar. 21, 2006

(54) CATHODE SATURATION ARRANGEMENT FOR FUEL CELL POWER PLANT

(75) Inventor: William P. Collins, South Windsor, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 111 days.

(21) Appl. No.: 10/723,081

(22) Filed: Nov. 26, 2003

(65) Prior Publication Data

US 2005/0112437 A1 May 26, 2005

(51) Int. Cl.
*H01M 8/04* (2006.01)
(52) U.S. Cl. ...................................................... 429/26
(58) Field of Classification Search .................. 429/13, 429/15, 17, 19, 20, 24, 26; 95/44, 52, 55, 95/228; 96/4, 6, 7, 12, 125; 48/198.3, 127.9; 29/623.5; 205/633; 156/289; 62/90
See application file for complete search history.

(56) References Cited

U.S. PATENT DOCUMENTS

| 4,530,886 A | 7/1985 | Sederquist ................... 429/13 |
| 4,539,267 A | 9/1985 | Sederquist ................... 429/17 |
| 5,382,478 A | 1/1995 | Chow et al. .................. 429/26 |
| 6,048,383 A | 4/2000 | Breault et al. .................. 95/44 |
| 6,274,259 B1 | 8/2001 | Grasso et al. ................. 429/13 |
| 6,416,892 B1 * | 7/2002 | Breault ........................ 429/13 |

OTHER PUBLICATIONS

Copending U.S. Appl. No. 10/723,200—Claims Only.*

* cited by examiner

*Primary Examiner*—Michael Barr
*Assistant Examiner*—Robert Hodge
(74) *Attorney, Agent, or Firm*—Stephen A. Schneeberger

(57) ABSTRACT

The heat from various portions of a fuel cell power plant (110) are redistributed in a manner allowing desired modification of/to the heat removal means (152,156), e. g., radiator (152), included in the coolant loop for the fuel cell stack assembly (CSA) (12). A humidifier (70) added in the coolant loop (114) and the inlet oxidant (air) stream (134') serves to relatively increase the humidification of the inlet air while removing heat from the coolant prior to entering the CSA (12). The combined effects are to relatively increase the temperature of the coolant exiting the CSA without similarly increasing the temperature of the coolant entering the CSA, and to relatively increase the temperature differential ("pinch") between the coolant entering the heat removal means and the cooling air of the heat removal means (152, 156). This latter effect permits a relative reduction in the size/capacity of the heat removal means (152, 156).

5 Claims, 3 Drawing Sheets

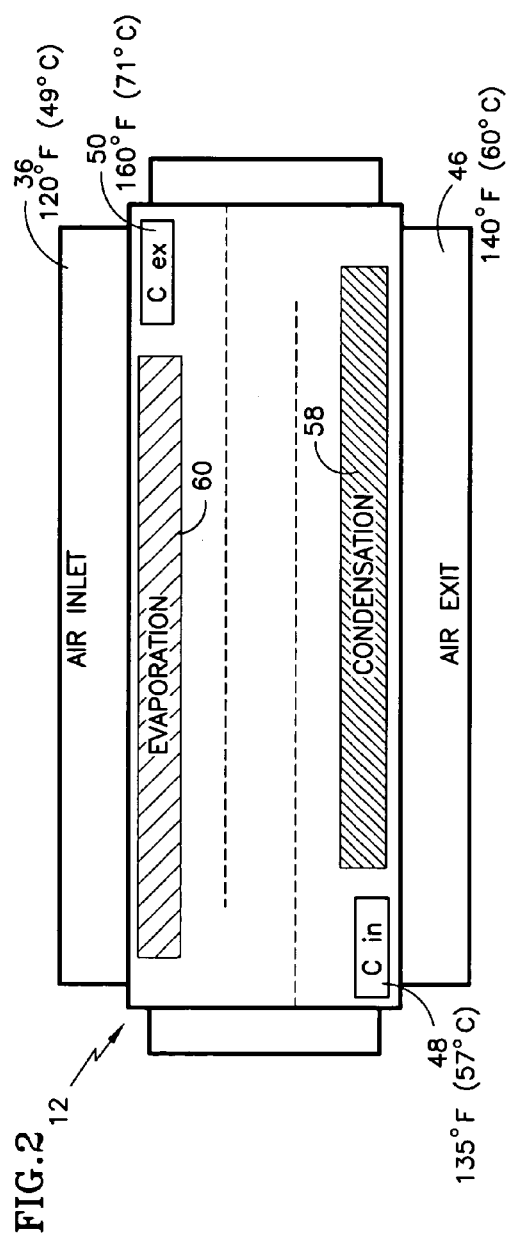
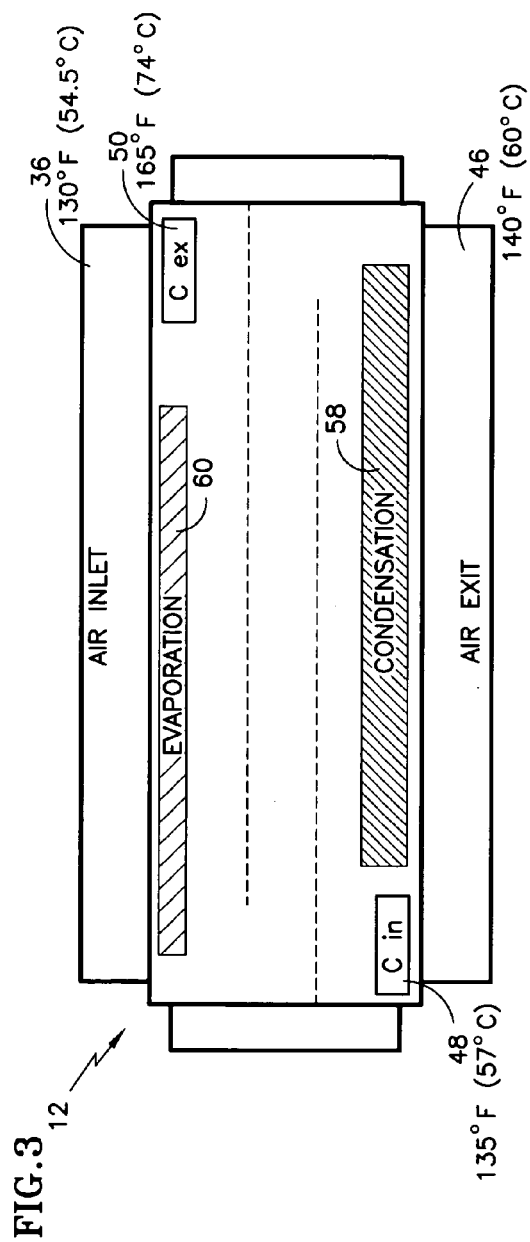

CATHODE SATURATION ARRANGEMENT FOR FUEL CELL POWER PLANT

TECHNICAL FIELD

This invention relates to fuel cell power plants, and particularly to the management of heat in a fuel cell power plant. More particularly still, the invention relates to a fuel cell cathode saturation arrangement for managing heat loads in a fuel cell power plant designed for volume optimization.

BACKGROUND ART

Fuel cell power plants are commonly used to produce electrical energy from reducing and oxidizing fluids to power electrical apparatus. In such power plants, one or typically a plurality, of planar fuel cells are arranged in a fuel cell stack, or cell stack assembly (CSA). Each cell generally includes an anode electrode and a cathode electrode separated by an electrolyte. A reducing fluid such as hydrogen is supplied to the anode electrode, and an oxidant such as oxygen or air is supplied to the cathode electrode. The reducing fluid and the oxidant are typically delivered to and removed from the cell stack via respective manifolds. In a cell using a proton exchange membrane (PEM) as the electrolyte, the hydrogen electrochemically reacts at a catalyst surface of the anode electrode to produce hydrogen ions and electrons. The electrons are conducted to an external load circuit and then returned to the cathode electrode, while the hydrogen ions transfer through the electrolyte to the cathode electrode, where they react with the oxidant and electrons to produce water and release thermal energy.

The anode and cathode electrodes of such fuel cells are separated by different types of electrolytes, depending on operating requirements and limitations of the working environment of the fuel cell. One such electrolyte is a PEM electrolyte, which consists of a solid polymer well known in the art. Other common electrolytes used in fuel cells include phosphoric acid, sulfuric acid, or potassium hydroxide held within a porous, non-conductive matrix between the anode and cathode electrodes. It has been found that PEM cells have substantial advantages over cells with liquid acid or alkaline electrolytes in satisfying specific operating parameters because the membrane of the PEM provides a barrier between the reducing fluid and oxidant that is more tolerant to pressure differentials, is fixed and cannot be leached from the cell, and has a relatively stable capacity for water retention.

In operation of PEM fuel cells, it is usually desirable that a proper water balance be maintained between the rate at which water is produced at the cathode electrode including water resulting from proton drag through the PEM electrolyte and the rate at which water is removed from the cathode and anode electrodes. This is to prevent excessive drying or flooding of one or more of the various elements of the fuel cell.

In addition to water balance in the fuel cell power plant, there is the further requirement of a coolant system for maintaining appropriate temperature of the various components of the power plant. Typically, though not necessarily, the coolant will also be the water discussed above with respect to the need for water balance. The coolant is typically used to remove heat from certain portions of the fuel cell power plant, as for instance the fuel cell stack assembly (CSA), though the coolant may in some instances serve also as a source of heat. The coolant may also serve as a source of moisture for the control of humidification of various gas streams in the fuel cell power plant. In these ways the coolant serves to address the various heat loads of various portions of the fuel cell power plant.

The CSA may include a coolant plate means, or the like, that defines a coolant channel through the cell stack assembly, typically adjacent to the cathode, and which forms part of a coolant loop that is both internal and external to the CSA. The coolant loop typically includes at least a circulation means, such as a pump, and some form of heat removal means, such as a radiator. Inasmuch as the electrochemical reaction in the CSA may be the source of considerable heat, the coolant serves the important role of removing heat from the CSA. Coolant entering the CSA adjacent to the exiting cathode exhaust serves to cool the exhaust stream and condense water out of that gas stream, through the use of fine pore media such as the coolant plate means that define the coolant channel adjacent the cathode exhaust. The amount of heat removed is a function of the coolant temperature and flow rate of the coolant entering the CSA.

Because the coolant is recirculated in the coolant loop, the heat removal means performs the important function of removing, prior to its reintroduction to the CSA, most of the heat acquired during the coolant's passage through the CSA. While the heat removal means might take a variety of forms, by far the most common is that of an air-cooled radiator. Typically, it is the task of the radiator to remove all of the heat acquired by the coolant's passage through the CSA. The air which cools the radiator is typically at some ambient temperature associated with the environment of the fuel cell power plant, and may typically be, or approach, 120° F. (49° C.), particularly if the CSA is being used in a hot environment such as a desert. Because the temperature of the coolant exiting the CSA is not substantially greater than that of the radiator-cooling air, or stated conversely, because the temperature of the radiator-cooling air may be only a little less than that of the coolant exiting the CSA, the resulting relatively small temperature differential, sometimes referred to as the "pinch", requires that the capacity of the radiator be relatively large in order to achieve the necessary cooling. On the other hand, this relative largeness of the radiator may be objectionable for several reasons, including initial cost, weight, size, appearance, and costs associated with its operation and maintenance.

Thus it is desirable to provide a fuel cell power plant in which the heat is managed in a manner allowing for a relative reduction in the sizing of the heat removal means, such as a radiator.

DISCLOSURE OF INVENTION

The heat and/or heat loads of various devices or portions of a fuel cell power plant are redistributed or re-allocated in a manner allowing desired modification of/to the heat removal means included in the coolant loop for the fuel cell stack assembly (CSA). The addition of a humidifier in the coolant loop and the inlet oxidant (air) stream serves to relatively increase the humidification of the inlet air while removing heat from the coolant prior to entering the CSA. The combined effects are to relatively increase the temperature of the coolant exiting the CSA without similarly increasing the temperature of the coolant entering the CSA, and further to relatively increase the temperature differential ("pinch") between the coolant entering the heat removal means and the cooling air of the heat removal means. This latter effect permits a relative reduction in the size/capacity of the heat removal means required.

In a fuel cell power plant, there is provided a fuel cell stack assembly (CSA), a coolant loop including a heat removal means, operatively associated with the CSA, and a humidifier operatively connected in the coolant loop. The CSA includes an anode region having an inlet and an outlet, a cathode region having an inlet and an outlet, an electrolyte region intermediate the anode and cathode regions, and a coolant region having an inlet and an outlet connected in the coolant loop. An inlet fuel stream is connected to the anode region inlet. An inlet oxidant stream is operatively connected to the cathode region inlet via the humidifier. The heat removal means may typically be a radiator, actively cooled by a medium such as air having a temperature somewhat less than that of the coolant from the CSA. The inlet oxidant stream is passed through the humidifier before entering the cathode of the CSA, and in the humidifier becomes at least partially, and typically heavily, humidified by mass and heat transfer association with the coolant also being passed through the humidifier. The humidifier needs to allow mass and heat transfer between two fluid streams, as via an energy recovery device (ERD). The ERD may preferably be of the type in which a fine pore medium separates the two streams but allows fluid transfer therebetween, or alternatively may be a bubble or contact saturator or the like in which there is direct contact between the two fluid streams without the presence of an intermediate porous barrier.

The foregoing features and advantages of the present invention will become more apparent in light of the following detailed description of exemplary embodiments thereof as illustrated in the accompanying drawings.

BRIEF DESCRIPTION OF DRAWINGS

FIG. 2 is a simplified graphic view of the evaporation/condensation profile in a standard fuel cell for an air stream that is not highly humidified;

FIG. 3 is a simplified graphic view of the evaporation/condensation profile in a standard fuel cell for an air stream that is highly humidified.

BEST MODE FOR CARRYING OUT THE INVENTION

Figure 1:
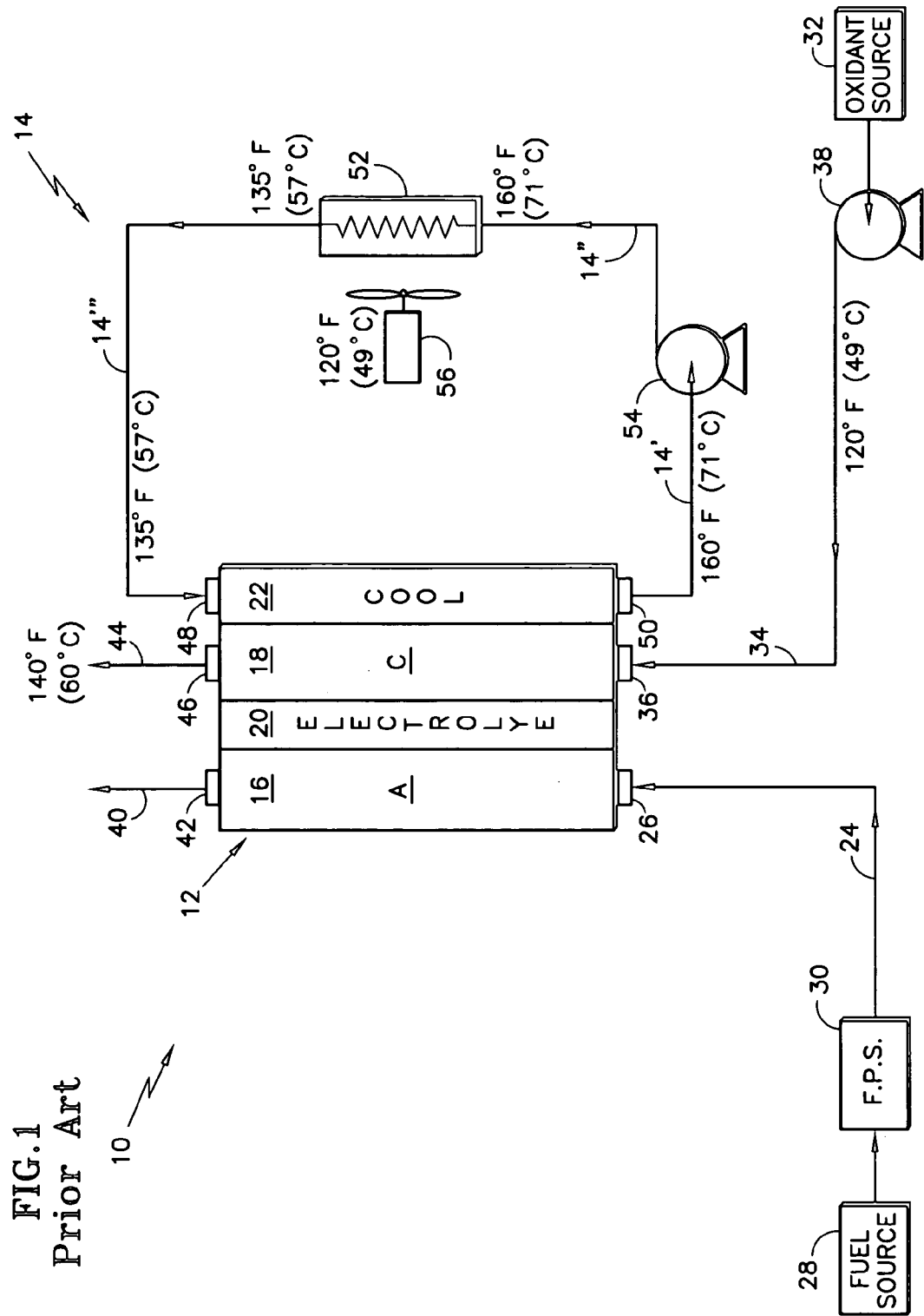
FIG. 1 is a simplified schematic diagram of a fuel cell power plant in accordance with the prior art, illustrating examples of temperatures at selected portions of the plant including the fuel cell stack assembly (CSA) and the coolant loop.

Referring to FIG. 1, there is depicted in simplified schematic diagram form a fuel cell power plant 10 in accordance with the prior art, indicating representative temperatures at selected portions of the plant, including a fuel cell stack assembly (CSA) 12 and a coolant loop 14. The fuel cell power plant 10 includes a number of fuel cells arranged in a known manner in a fuel cell stack assembly 12. Although the illustration of CSA 12 in FIG. 1 is intended to embrace plural fuel cells, it is depicted as a single cell for ease of illustration and reference. Each fuel cell, and thus the CSA 12, typically includes an anode region 16, a cathode region 18, an electrolyte region 20 between the anode region 16 and the cathode region 18, and a coolant region or coolant channel 22, typically adjacent the cathode region 18. The electrolyte is preferably a proton exchange membrane (PEM) type employing a solid polymer well known in the art.

In the fuel cell power plant 10, a reducing agent in the form of a hydrogen-rich fuel stream 24 is supplied to the anode region 16, as at anode inlet 26. The various anode, cathode, and coolant region inlets and outlets mentioned hereinafter are typically in the form of manifolds serving the respective regions. The hydrogen-rich fuel stream 24 is typically derived from a hydrocarbon fuel source 28 by means of a fuel processing system (FPS) 30 of known design. A source of oxidant 32, such as air, supplies an oxidant stream 34 to the cathode region 18 via cathode inlet 36, which flow may be assisted in a known manner by a motive device, such as a fan, compressor, or blower 38.

After passing through the anode region 16, partially-depleted fuel is discharged or exhausted as anode exhaust stream 40 at anode outlet 42. After passing through the cathode region 18, partially-depleted oxidant is exhausted as cathode exhaust stream 44 at cathode outlet 46.

The coolant channel 22 is an included portion of the coolant loop 14, and may be defined by a sealed or a porous coolant plate, not separately shown. When characterized as a sealed plate, the coolant, typically water, may not flow between the coolant channel 22 and the cathode and/or anode regions 18, 16. On the other hand, when characterized as a fine-pore, porous plate, the coolant water and product water may pass between the coolant channel 22 and the cathode and/or anode regions 18, 16 via the pores. In either event, water in the coolant loop 14 enters the coolant channel 22 of CSA 12 at inlet 48 and returns to the loop via outlet 50. The coolant loop 14 is here shown in simplified form as containing a heat removal means, such as radiator 52, and a circulation-assistance means, such as pump 54. A coolant loop portion 14' connects coolant channel outlet 50 with pump 54, a portion 14" connects pump 54 with the inlet to radiator 52, and a further portion 14'" connects the outlet of radiator 52 to the coolant channel inlet 48. The radiator 52 includes a motorized fan 56 for forcing air through, or across, the radiator to effect heat transfer between that air and the liquid coolant passing through the radiator and the coolant loop 14. The coolant loop 14 may additionally include a variety of means, not shown, for cleansing, degasifying, adding and/or discharging, and/or otherwise processing the coolant, as is known in the art.

In the conventional power plant configuration depicted in FIG. 1, the radiator 52 may need to be relatively large to provide the amount of cooling needed to remove heat acquired during the coolant's passage through the CSA 12. The function of the coolant as it passes through the CSA 12 is to remove heat generated by the fuel cell reaction.

The sizing of radiator 52 is primarily governed by the difference in temperature between the coolant exiting the CSA 12 on coolant loop portions 14', and 14" and thus entering the radiator, and the air being delivered by fan 56 to remove heat from the coolant in the radiator. In this consideration, the coolant outlet 50 of CSA 12 may be viewed as the "Source" of heat and the air-cooled radiator 52 as the "Sink". As the difference between these two temperatures gets smaller, or closer, the radiator size and fan power requirements get larger, and in a non-linear manner, such that a small decrease in that temperature differential may result in a relatively much larger change (increase) in the size of the radiator 52. Conversely, a small increase in that temperature differential may enable a significant decrease in the size of the radiator 52, other things being relatively constant. This result is accomplished by adjusting the operating points, and thus the energy concentration, or temperature, at various points in the system. Reference will be made to initial operating conditions and temperatures in FIG. 1 as being representative of the prior art. It should be understood that the temperatures mentioned herein with respect to FIGS. 1–4 are meant to be arbitrary and merely exemplary and in no way limiting, and are cited principally for illustrative comparative purposes. If it is assumed the ambient air at, or in, the fuel cell power plant 10 is about 120° F. (49° C.), as in a worst case operating condition, then it will be seen that both the air (oxidant) stream 34 entering the cathode 18 and the air at fan 56 being used to cool radiator are at 120° F. (49° C.). For this explanation of FIG. 1, assume that the coolant entering coolant channel 22 at coolant inlet 48 has a temperature of about 135° F. (57° C.), and the temperature of the coolant exiting the coolant channel 22 at outlet 50 will have a temperature of about 160° F. (71° C.). Thus, it is necessary to obtain a 25° F. (14° C.) coolant temperature drop across the radiator 52 with Source-to-Sink temperature difference of only 40° F. (22° C.), thereby requiring a relatively large radiator and fan.

At this juncture it is useful to consider the evaporation/condensation profiles of a typical fuel cell in which, first, the cathode air stream is not highly humidified, as seen in FIG. 2, and secondly, the cathode air stream is highly, or at least relatively more highly, humidified, or saturated, as seen in FIG. 3. It should be understood when referring to FIGS. 2 and 3 that some graphic license is used in depicting the interior of a fuel cell, especially the cathode air stream and the coolant flow path, and although the orientations are dissimilar from FIG. 1, the appropriate reference numerals have been used.

Referring first to FIG. 2, the coolant enters the CSA 12 at coolant inlet 48, which is along the edge, or in the area, where the cathode air exits, as at cathode outlet 46. The coolant serves to cool the cathode exhaust stream there and condense water out of the cathode exhaust. That condensed water is represented quantitatively and locationally by the dense hatching 58. Correspondingly, the heat is removed from the cathode gas stream and enters the coolant. The amount of heat removed is a function of the coolant inlet 48 temperature and flow rate to the CSA. For the same flow rate, a reduction in coolant temperature results in more water being condensed. In a representative fuel cell power plant, sufficient water is condensed to maintain water balance in the power plant 10, including the FPS 30 and the coolant loop 14, if the coolant flow is sufficient, for example 45 pph/cell, and the coolant temperature is low enough, for example 135° F. (57° C.). Thus, regardless of activity in the remainder of the coolant loop 14 of FIG. 1, if the coolant inlet 48 meets the aforementioned conditions, then the power plant shall be in water balance.

Referring further to FIG. 2, the coolant exits the CSA 12 at coolant outlet 50, which is along the edge, or in the area, where the air enters the cathode 18, as at cathode inlet 36. The heated coolant water serves to heat and, to some extent, humidify this cathode air stream because the CSA 12 in this respect operates in a manner analogous to an energy recovery device. That humidification occurs in an evaporation region of the fuel cell that is represented quantitatively and locationally by the simple hatching 60. In this evaporation region 60, the heat is removed from the coolant and enters the cathode gas stream. The temperature of the coolant correspondingly drops such that, in the aforementioned representative example, the coolant temperature at the coolant outlet is about 160° F. (71° C.). These temperatures are consistent with those depicted in the system of FIG. 1.

Reference is now made to FIG. 3, which is similar in most respects to FIG. 2, but in which the air stream entering the cathode 18 at cathode inlet 36 has already been humidified to a dew point approximate to the inlet temperature of the CSA 12, such that relatively less heat and water is required to complete the humidification to local operating conditions of the CSA 12. This difference is depicted by the evaporation region 60 in FIG. 3 being relatively smaller than it was in FIG. 2., and results in a higher-grade (temperature) heat exiting the fuel cell (or CSA 16) in the coolant at coolant outlet 50. For the example mentioned above, if the dew point of the air stream entering the cathode inlet 36 were now 130° F. (54.5° C.) as a result of its increased humidification prior to that point, the coolant temperature at coolant exit 50 would increase to about 165° F. (74° C.).

Simply raising the temperature of the coolant exiting the fuel cell/CSA 12 at coolant outlet 50 does not, in and of itself, accomplish the objective of being able to reduce the radiator size. This is principally because it would also relatively raise the temperature of the coolant entering coolant inlet 48, which runs counter to the discussion above which required that temperature to remain at about 135° F. (57° C.). However, the process of partially humidifying the air stream for delivery to the cathode inlet 36 overcomes that obstacle. Based on the example discussed above, by humidifying the air stream to a dew point of 135° F. (57° C.), there results the transfer of heat equivalent to the removal of more than 5° F. (3° C.) from the coolant. This is attained by the addition of a humidifying device in accordance with the invention.

Figure 4:
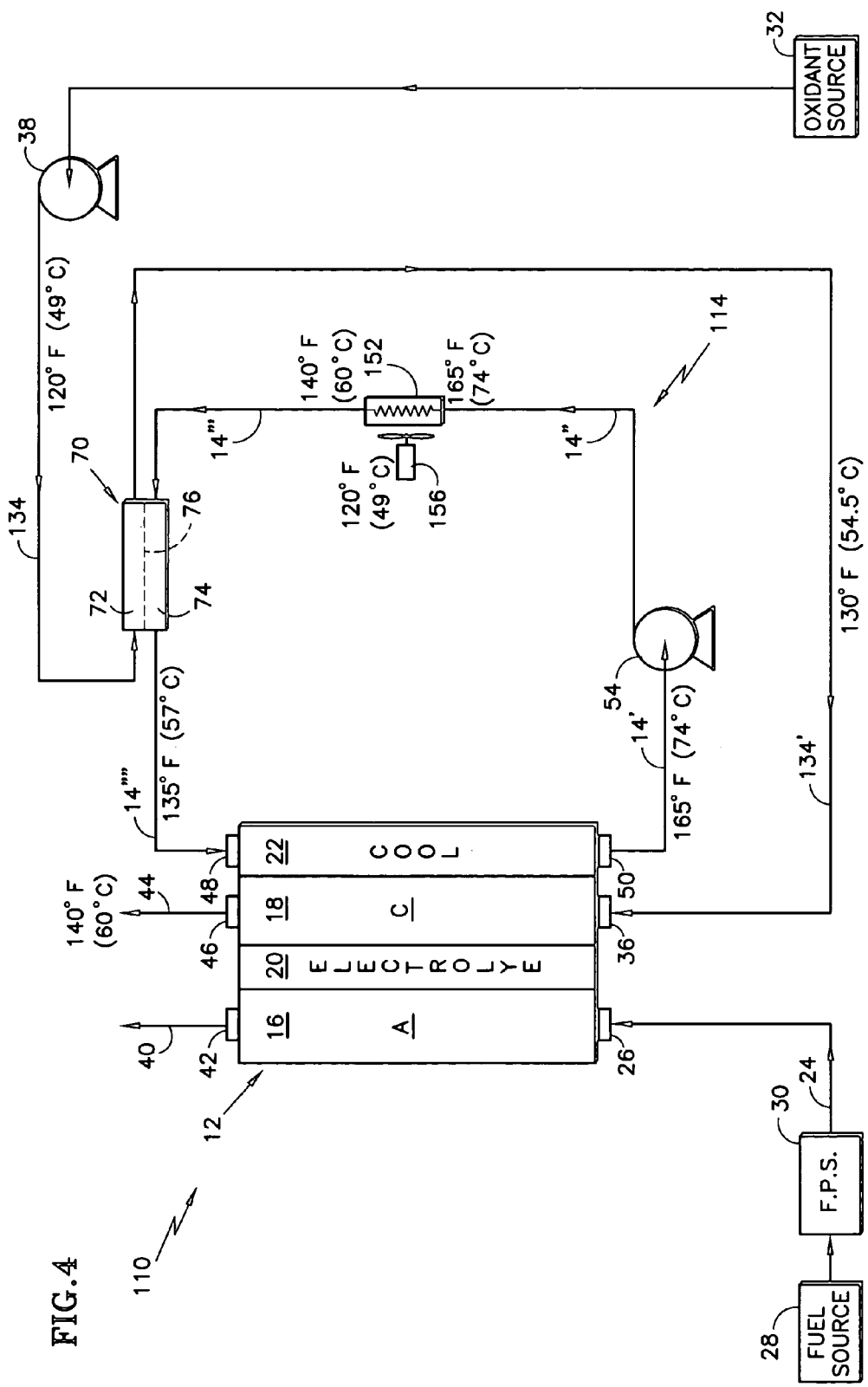
FIG. 4 is a simplified schematic diagram similar to FIG. 1, of a fuel cell power plant in accordance with the invention, illustrating the inclusion of a humidifier for humidifying the inlet oxidant and further cooling the coolant, and illustrating examples of temperatures at selected portions of the plant.

Referring to FIG. 4, there is depicted a fuel cell power plant 110 in accordance with the invention. Reference numbers identical to those of FIG. 1 are used in FIG. 4 for those components that are the same, or substantially the same, in the two configurations. However, where there is some functional, compositional, or structural difference occasioned by the invention, but the components of FIG. 4 nevertheless remain analogous to components in FIG. 1, they have been given the same reference number, but preceded by a "1". The following description will emphasize the novel character, structure, and/or function of the contaminant removal system of the invention, and will attempt to minimize repetition of description that is duplicative of that provided with respect to FIG. 1.

While the fuel cell power plant 110 of FIG. 4 is similar in most respects to the power plant 10 described with respect to FIG. 1, it differs in at least the important aspect that the addition of a humidifying device 70 enables the use of relatively smaller, simpler heat removal devices, in the form of a relatively smaller radiator 152 and motorized fan 156. The humidifying device 70 is a relatively simple, small, and inexpensive device, and may typically take the form of an energy recovery device (ERD) having a gas flow chamber 72 and a liquid, or coolant, flow chamber 74 separated by an enthalpy exchange barrier 76 therebetween. The humidifying device 70, hereinafter also referred to as "ERD 70", may be of any generally known construction in which an oxidant (air) stream and a coolant (water) stream may be passed in relative heat and mass transfer relation for relatively increasing the dew point/humidity of the air entering the cathode 18 of CSA 12 while also removing heat from the coolant to be entering the coolant channel 22 of the CSA. It is preferred that the ERD 70 be sufficiently compact, simple and inexpensive to offset those aspects of the prior radiator 52 and/or motorized fan 56 relative to the radiator 152 and/or motorized fan 156 replacing them. A preferred ERD 70 is of the type having adjacent gas and liquid chambers, 72 and 74 respectively, separated by a fine pore saturator medium, typically of graphite of the like, forming the enthalpy exchange barrier 76. A detailed description of one such arrangement may be found in U.S. Pat. No. 6,274,259 to Grasso, et al and assigned to the assignee of the present invention, though the present invention may not require the inclusion of that patent's transfer medium loop for wetting the enthalpy exchange barrier 76 herein. Other acceptable barriers may be of the type similar to the fine pore, water transfer plates such as used in/for the coolant channels within the CSA 12. An alternative form of humidifier or energy recovery device, 70, may be a bubble or contact saturator (not separately shown) in which the oxidant (air) stream is brought directly into contact with the coolant (water), as in a tank, reservoir, conduit, or the like, to effect the requisite transfer of mass and energy between the two fluids without requiring that transfer to occur indirectly via an intermediate enthalpy exchange barrier.

The humidifying device 70 is inserted into the coolant loop 114 relatively downstream of the radiator 152 and relatively upstream of the coolant inlet 48 to the coolant channel 22 in CSA 12. Similarly, the humidifying device 70 is in the inlet oxidant stream between the oxidant source 32 and the cathode inlet 36 to the cathode 18 of CSA 12. A coolant loop portion 114''' connects the outlet, or discharge end, of radiator 152 to the inlet end of coolant flow chamber 74 of ERD 70, and a coolant loop portion 114'''' connects the outlet end of that coolant flow chamber to the coolant inlet 48 of CSA 12. An oxidant conduit portion 134 connects oxidant from blower 38 to the inlet end of the gas flow chamber 72 of ERD 70, and a further oxidant conduit portion 134' connects the outlet end of that gas flow chamber to the cathode inlet 36 of CSA 12. It will be understood that the blower 38 may be located either prior to the inlet or after the outlet, of gas flow chamber 72. It is generally desirable for the air in gas flow chamber 72 and the water in coolant flow chamber 74 to flow in counter flow relation to one another for maximum efficiency of the ERD, though other configurations are within the scope of the invention.

Referring further to the operation of power plant 110 with the inclusion of the humidifying device 70, it is now possible to both relatively increase the dew point/humidity of the oxidant prior to its entry into cathode 18 and further cool the coolant leaving the radiator 152 prior to its entry into coolant channel 22. This results in the redistribution of heat in the power plant, and particularly the CSA 12, the coolant loop 114, and the fan 156 and radiator 152 within the coolant loop. This redistribution of the heat is illustrated by a comparison of the temperatures at various locations in the power plant 110 of FIG. 4 relative to the temperatures at similar locations in the power plant of FIG. 1. It is now seen that the humidification of the oxidant prior to its introduction to cathode 18 results in a temperature of about 130° F. (54.5° C.) on conduit 134' at the cathode inlet 36, which in turn requires less heat from the coolant to complete the humidification process in CSA 12 and thus results in a higher grade heat, i. e., 165° F. (74° C.), of the coolant exiting CSA 12 at coolant outlet 50. This higher-grade heat in the coolant similarly appears in coolant loop portion 14'' at the inlet to the radiator 152 and, because the ambient air from fan 156 remains at 120° F. (49° C.), the temperature difference therebetween is relatively increased. This enables the radiator 152 to effect the same amount of cooling, i. e., a drop of about 25° F. (14° C.) to 140° F. (60° C.) at its outlet on loop portion 114''', with a radiator of relatively smaller capacity than that required for the same temperature drop across the radiator 52 of FIG. 1. This is accomplished because even though the temperature of the coolant leaving radiator 152 is 5° F. (3° C.) higher than the 135° F. (57° C.) temperature desired for the coolant entering the coolant channel 22 at inlet 48, that desired temperature (135° F., 57° C.) is attained when the coolant from coolant loop portion 114''' passes through the coolant flow chamber 74 of humidifier 70 and exits into coolant loop portion 114''''. That further cooling of the coolant occurs as the result of the heat removed therefrom during the oxidant humidification process in ERD 70, as described earlier.

In view of the forgoing discussion, it will be appreciated that the fuel cell power plant 110 may be operated as satisfactorily as was the power plant 10, yet with a relatively smaller and simpler radiator 152/motorized fan 156 than was the case in power plant 10, and at an additional "cost" of only a relatively simple, compact, and inexpensive ERD/humidifier 70. On balance, the reduced size and cost of the radiator 152/fan 156 is typically a net advantage over any increased cost and size of the added humidifier 70.

Although the invention has been described and illustrated with respect to the exemplary embodiments thereof, it should be understood by those skilled in the art that the foregoing and various other changes, omissions and additions may be made without departing from the spirit and scope of the invention. For example, the radiator 52 of the heat removal means may be any of numerous types of heat exchangers, e.g., liquid to liquid, liquid to gas, etc. Moreover, the humidifying device 70 may take various forms, including the fine pore saturator medium of an ERD, the water transfer plates as in a CSA, a bubble saturator, or the like, as well as others.

What is claimed is:

1. A fuel cell power plant (110) comprising:
a fuel cell stack assembly (12); an inlet oxidant stream (134, 134') operatively connected to a fuel cell stack assembly oxidant region inlet (36); a coolant loop (114) operatively connected to a fuel cell stack assembly coolant region inlet (48) and outlet (50), the coolant loop (114) including a heat removal means (152, 156) configured to transfer heat from a fuel cell stack assembly coolant; and a humidifier (70) operatively connected in the coolant loop (114) between the heat removal means (152, 156) and the fuel cell stack assembly coolant region inlet (48) and operatively connected in the inlet oxidant stream (134, 134'), the humidifier configured for both cooling the coolant prior to return introduction of the coolant to the fuel cell stack assembly (12) and for relatively increasing the temperature and humidity of the inlet oxidant stream (134, 134') prior to introduction of the inlet oxidant stream to the fuel cell stack assembly oxidant region inlet (36).

2. The fuel cell power plant (110) of claim 1 wherein the heat removal means (152, 156) comprises a radiator (152) and motorized fan (156).

3. The fuel cell power plant (110) of claim 1 wherein the humidifier (70) comprises an energy recovery device (70) for heat and mass transfer between the inlet oxidant stream (134) and coolant (114''') being returned from the heat removal means (152, 156) to the fuel cell stack assembly (12).

4. The fuel cell power plant (110) of claim 3 wherein the energy recovery device (70) comprises a gas flow chamber (72) and a liquid coolant flow chamber (74) separated by a fine pore enthalpy exchange barrier (76).

5. The fuel cell power plant (110) of claim 3 wherein the energy recovery device (70) comprises a saturator having the inlet oxidant stream (134) in direct contact with coolant (114''') being returned from the heat removal means (152, 156) to the fuel cell stack assembly (12).

* * * * *